(12) United States Patent
Wysocki et al.

(10) Patent No.: US 12,071,296 B2
(45) Date of Patent: *Aug. 27, 2024

(54) FACILITATING INTER-SYSTEM DATA TRANSFER WITH SERALIZED DATA OBJECTS

(71) Applicant: TD Ameritrade IP Company, Inc., San Francisco, CA (US)

(72) Inventors: Kevin Michael Wysocki, Denver, CO (US); Michelle Schroeder, O'Fallon, MO (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,253

(22) Filed: Jul. 17, 2023

(65) Prior Publication Data

US 2023/0356913 A1 Nov. 9, 2023

Related U.S. Application Data

(63) Continuation of application No. 18/047,858, filed on Oct. 19, 2022, now Pat. No. 11,767,154, which is a
(Continued)

(51) Int. Cl.
*B65D 81/26* (2006.01)
*B32B 1/00* (2006.01)
(Continued)

(52) U.S. Cl.
CPC ............. *B65D 81/268* (2013.01); *B32B 1/00* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS 5,774,670 A * 6/1998 Montulli ............ G06Q 30/0603
709/227
5,948,061 A 9/1999 Merriman et al.
(Continued)

OTHER PUBLICATIONS

A. Barth; Internet Engineering Task Force (IETF); "RFC 6265—HTTP State Management Mechanism"; Apr. 2011; 37 pages.
(Continued)

*Primary Examiner* — Lashonda Jacobs-Burton
(74) *Attorney, Agent, or Firm* — Harness, Dickey & Pierce, P.L.C.

(57) ABSTRACT

A computer server includes processor and memory hardware. The processor hardware executes instructions including parsing a hypertext transfer protocol (HTTP) request from a first user agent to identify a first data object matching a set of characteristics and generating a new data element based on the HTTP request. The instructions include, in response to the first data object being present: extracting a first set of serialized data elements and serializing them with the new data element to generate a second data object. The instructions include, in response to the first data object being absent and a user associated with the first user agent being identifiable: determining a second set of serialized data elements based on an identity of the user, and serializing them with the new data element to generate the second data object. The instructions include transmitting an HTTP response including the second data object.

20 Claims, 8 Drawing Sheets

Related U.S. Application Data continuation of application No. 17/264,995, filed on Feb. 2, 2021, now Pat. No. 11,514,131, which is a continuation-in-part of application No. 17/060,041, filed on Sep. 30, 2020, now Pat. No. 11,228,632.

(60) Provisional application No. 63/082,401, filed on Sep. 23, 2020.

(51) Int. Cl.

| | | |
|---|---|---|
| *B32B 7/12* | (2006.01) | |
| *B32B 27/08* | (2006.01) | |
| *B32B 27/20* | (2006.01) | |
| *B32B 27/30* | (2006.01) | |
| *B32B 27/32* | (2006.01) | |
| *B65B 11/52* | (2006.01) | |
| *B65B 25/06* | (2006.01) | |
| *B65B 31/02* | (2006.01) | |
| *B65B 51/22* | (2006.01) | |
| *B65D 65/40* | (2006.01) | |
| *B65D 77/04* | (2006.01) | |
| *G06Q 30/02* | (2023.01) | |
| *G06Q 30/0251* | (2023.01) | |
| *H04L 67/02* | (2022.01) | |

(52) U.S. Cl.
CPC .......... *B32B 27/20* (2013.01); *B32B 27/304* (2013.01); *B32B 27/306* (2013.01); *B32B 27/32* (2013.01); *B65B 11/52* (2013.01); *B65B 25/062* (2013.01); *B65B 25/067* (2013.01); *B65B 31/024* (2013.01); *B65B 51/225* (2013.01); *B65D 65/40* (2013.01); *B65D 77/04* (2013.01); *G06Q 30/02* (2013.01); *G06Q 30/0251* (2013.01); *G06Q 30/0255* (2013.01); *H04L 67/02* (2013.01); *B32B 2250/03* (2013.01); *B32B 2250/05* (2013.01); *B32B 2250/24* (2013.01); *B32B 2264/1021* (2020.08); *B32B 2270/00* (2013.01); *B32B 2307/31* (2013.01); *B32B 2307/724* (2013.01); *B32B 2307/7244* (2013.01); *B32B 2307/736* (2013.01); *B32B 2439/70* (2013.01); *B65B 2220/16* (2013.01); *B65D 2565/387* (2013.01); *B65D 2565/388* (2013.01); *B65D 2577/043* (2013.01)

(56) References Cited

U.S. PATENT DOCUMENTS

| | | | | |
|---|---|---|---|---|
| 8,898,808 | B1 * | 11/2014 | Kittrell | G06F 16/9535 |
| | | | | 726/30 |
| 8,990,359 | B1 * | 3/2015 | Ravi | G06F 40/143 |
| | | | | 709/219 |
| 9,135,655 | B2 * | 9/2015 | Buchalter | G06Q 30/0241 |
| 9,219,787 | B1 * | 12/2015 | Manion | H04L 67/142 |
| 9,332,065 | B2 * | 5/2016 | Ravi | G06F 40/143 |
| 9,361,631 | B2 * | 6/2016 | Meyer | G06Q 30/0256 |
| 9,418,170 | B2 * | 8/2016 | Seolas | G06F 16/951 |
| 9,553,918 | B1 * | 1/2017 | Manion | G06F 16/40 |
| 9,553,923 | B2 * | 1/2017 | Ravi | H04L 67/53 |
| 9,691,080 | B1 * | 6/2017 | Torrance | G06Q 30/0255 |
| 9,973,585 | B2 * | 5/2018 | Ruback | H04W 4/21 |
| 10,108,982 | B2 * | 10/2018 | Patton | G06Q 30/0269 |
| 10,861,047 | B2 * | 12/2020 | Patton | G06Q 30/0277 |
| 11,228,632 | B1 | 1/2022 | Wysocki et al. | |
| 2005/0165644 | A1 * | 7/2005 | Beyda | G06Q 30/0277 |
| | | | | 705/14.69 |
| 2011/0029376 | A1 * | 2/2011 | Mills | G06Q 30/02 |
| | | | | 705/14.43 |
| 2011/0246267 | A1 * | 10/2011 | Williams | G06Q 30/08 |
| | | | | 705/14.4 |
| 2012/0054143 | A1 * | 3/2012 | Doig | G06Q 30/0243 |
| | | | | 706/47 |
| 2013/0136253 | A1 * | 5/2013 | Liberman Ben-Ami | |
| | | | | H04M 3/5191 |
| | | | | 379/265.09 |
| 2014/0244387 | A1 * | 8/2014 | Patton | G06Q 30/0269 |
| | | | | 705/14.53 |
| 2014/0278926 | A1 * | 9/2014 | Close | G06Q 30/0246 |
| | | | | 705/14.45 |
| 2015/0058121 | A1 * | 2/2015 | Navin | H04L 67/535 |
| | | | | 705/14.53 |
| 2015/0170200 | A1 * | 6/2015 | Rajkumar | G06Q 30/0251 |
| | | | | 705/14.49 |
| 2016/0180375 | A1 * | 6/2016 | Rose | G06Q 30/0244 |
| | | | | 705/14.43 |
| 2017/0178253 | A1 * | 6/2017 | Koufogiannakis | G06Q 50/01 |
| 2017/0357998 | A1 * | 12/2017 | Scharf | G06Q 30/0242 |
| 2017/0372376 | A1 * | 12/2017 | Scharf | G06Q 30/0273 |
| 2018/0225711 | A1 * | 8/2018 | Murugesan | G06Q 30/0254 |

OTHER PUBLICATIONS

Notice of Allowance dated Dec. 15, 2021, issued in corresponding U.S. Appl. No. 15/166,450.

* cited by examiner

FACILITATING INTER-SYSTEM DATA TRANSFER WITH SERALIZED DATA OBJECTS

CROSS-REFERENCE TO RELATED APPLICATIONS

This application is a continuation of U.S. patent application Ser. No. 18/047,858 filed Oct. 19, 2022 (now U.S. Pat. No. 11,767,154), which is a continuation of U.S. patent application Ser. No. 17/164,995 filed Feb. 2, 2021 (now U.S. Pat. No. 11,514,131), which is a continuation-in-part of U.S. patent application Ser. No. 17/060,041 filed Sep. 30, 2020 (now U.S. Pat. No. 11,228,632), which claims the benefit of U.S. Provisional Application No. 63/082,401 filed Sep. 23, 2020. The entire disclosures of the above applications are incorporated by reference.

FIELD

The present disclosure relates to systems and methods for distributed networking and more particularly to systems and methods of facilitating inter-system data transfer in distributed networks.

BACKGROUND

Digital advertising has become increasingly important to companies as users across the world are spending more time online. For example, companies may rely on targeted advertising directed to specific users based on certain traits, interests, products, services, etc. Cookies are commonly relied on to implement targeted advertising. For example, cookies may be set in a web browser of a user's computing device while browsing a website. The cookies may be used to identify the user and track information for the user, such as items added to a digital shopping cart, browsing activities, searches, etc.

The cookies may include first-party cookies and third-party cookies. First-party cookies are cookies set by the domain the user is currently visiting in the context of an interactive web browser, that is the domain specified by the uniform resource locator (URL) in the browser's address bar. Third-party cookies are cookies created by domains other than the one the user is currently visiting.

Third-party cookies are commonly used in cross-site tracking, targeting, and ad-serving—otherwise, each website would only have a silo of its own data. Further, without third-party cookies, the operator of each website would need to develop a robust cookie serving architecture, which works consistently across browsers and across platforms. Third-party cookies allow websites to benefit from the experience of companies (such as Google LLC) that specialize in this technology.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer server includes processor hardware and memory hardware coupled to the processor hardware. The memory hardware stores instructions for execution by the processor hardware. The instructions include, in response to receiving a first hypertext transfer protocol (HTTP) request from a first user agent, parsing the first HTTP request to identify a first data object matching a set of characteristics and generating a new data element based on the first HTTP request. The instructions include, in response to the first data object being present: extracting a first set of serialized data elements from the first data object, and generating a second data object based on serializing the new data element and the first set of serialized data elements. The instructions include, in response to the first data object being absent and a user of the first user agent being identifiable: determining a second set of serialized data elements based on an identity of the user, and generating the second data object based on serializing the new data element and the second set of serialized data elements. The instructions include transmitting a first HTTP response to the first user agent. The first HTTP response includes the second data object.

In other features, each data element in the second data object is associated with a timestamp. An order of the data elements within the second data object is determined by sorting on the timestamps. In other features, the first data object is a name-value pair and the set of characteristics is a predefined name of the name-value pair. In other features, the first data object is included in a cookie header of the HTTP request. In other features, the first HTTP response includes the second data object in an HTTP header. In other features, the HTTP header is a set-cookie header.

In other features, the instructions include, in response to the first data object being absent and a user of the first user agent not being identifiable, generating the second data object based on the new data element. In other features, the new data element is generated based on information encoded in a uniform resource locator (URL) specified by the first HTTP request. In other features, the information is encoded in a query string of the URL. In other features, the new data element includes a timestamp.

In other features, the instructions include transmitting the new data element to a database server. In other features, additional metadata is transmitted to the database server along with the new data element. The additional metadata includes information based on a user-agent string from the first HTTP request. In other features, the additional metadata includes at least one of an internet protocol (IP) address of the user agent and a geolocation of the user agent. In other features, identification of the user is performed based on an internet protocol (IP) of the user agent. In other features, identification of the user is performed based on a cookie within the first HTTP request that is distinct from the first data object.

In other features, the second set of serialized data elements is determined by sending a request indicating the identity of the user to a database server. In other features, the second set of serialized data elements is determined by consulting a cache according to the identity of the user and, in response to a miss in the cache for the identity of the user, sending a request indicating the identity of the user to a database server. In other features, the instructions include, in response to a hit in the cache for the identity of the user, sending the request indicating the identity of the user to the database server. In other features, the first HTTP response includes an image. In other features, the image is one pixel in height and one pixel in width.

A system for capturing impression data includes a computer server in communication with a user's computing device via a communications network. The computer server is configured to generate a pixel for embedding in a digital communication viewable in a web browser on the user's computing device. The pixel is served from a domain associated with the computer server. The computer server is configured to, in response to the digital communication being viewed in the web browser on the user's computing device, set a cookie on the user's computing device via the pixel. The cookie is configured to store data associated with one or more impressions of digital communications viewed on the user's computing device. The computer server is configured to, in response to the user's computing device accessing the domain via the web browser, receive the stored data associated with the one or more impressions from the cookie set on the user's computing device.

In other features, the computer server is configured to update the cookie set on the user's computing device. In other features, the system includes a database in communication with the computer server and configured to store the received data associated with the one or more impressions. In other features, the data associated with each impression includes data identifying an advertisement and data identifying when the advertisement was viewed. In other features, the cookie set on the user's computing device is configured to store data associated with a defined number of impressions. In other features, the defined number of impressions includes ten impressions.

In other features, the cookie is configured to store data associated with the one or more impressions in a chronological order. In other features, in response to the defined number of impressions being met, the cookie is configured to push out data associated with the oldest viewed impression and store data associated with the newest viewed impression. In other features, the cookie is treated by the web browser as a first-party cookie if the user's computing device has previously accessed the domain.

A computerized method of capturing impression data includes generating a pixel for embedding in a digital communication viewable in a web browser on a user's computing device. The pixel is served from a domain associated with a computer server. The method includes, in response to the digital communication being viewed in the web browser on the user's computing device, using the computer server to set a cookie on the user's computing device via the pixel. The cookie is configured to store data associated with one or more impressions of digital communications viewed on the user's computing device. The method includes, in response to the user's computing device accessing the domain via the web browser, using the computer server to receive the stored data associated with the one or more impressions from the cookie set on the user's computing device.

In other features, the computerized method includes updating the cookie set on the user's computing device. In other features, the computerized method includes storing the received data associated with the one or more impressions. In other features, the data associated with each impression includes data identifying an advertisement and data identifying when the advertisement was viewed. In other features, the cookie set on the user's computing device is configured to store data associated with a defined number of impressions. In other features, the defined number of impressions includes ten impressions.

In other features, the cookie is configured to store data associated with the one or more impressions in a chronological order. In other features, in response to the defined number of impressions being met, the cookie is configured to push out data associated with the oldest viewed impression and store data associated with the newest viewed impression. In other features, the cookie is treated by the web browser as a first-party cookie if the user's computing device has previously accessed the domain.

A system for transferring data to and from a computing device of a user system includes processor hardware and memory hardware configured to store instructions for execution by the processor hardware. The instructions include generating a pixel for embedding in a digital communication viewable in a web browser on a computing device. The pixel is served from a domain associated with the system. The instructions include, in response to the digital communication being viewed in the web browser on the computing device, setting a cookie on the computing device via the pixel. The cookie is configured to store data associated with one or more impressions of digital communications viewed on the computing device. The instructions include, in response to the computing device accessing the domain via the web browser, receiving the stored data associated with the one or more impressions from the cookie set on the computing device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
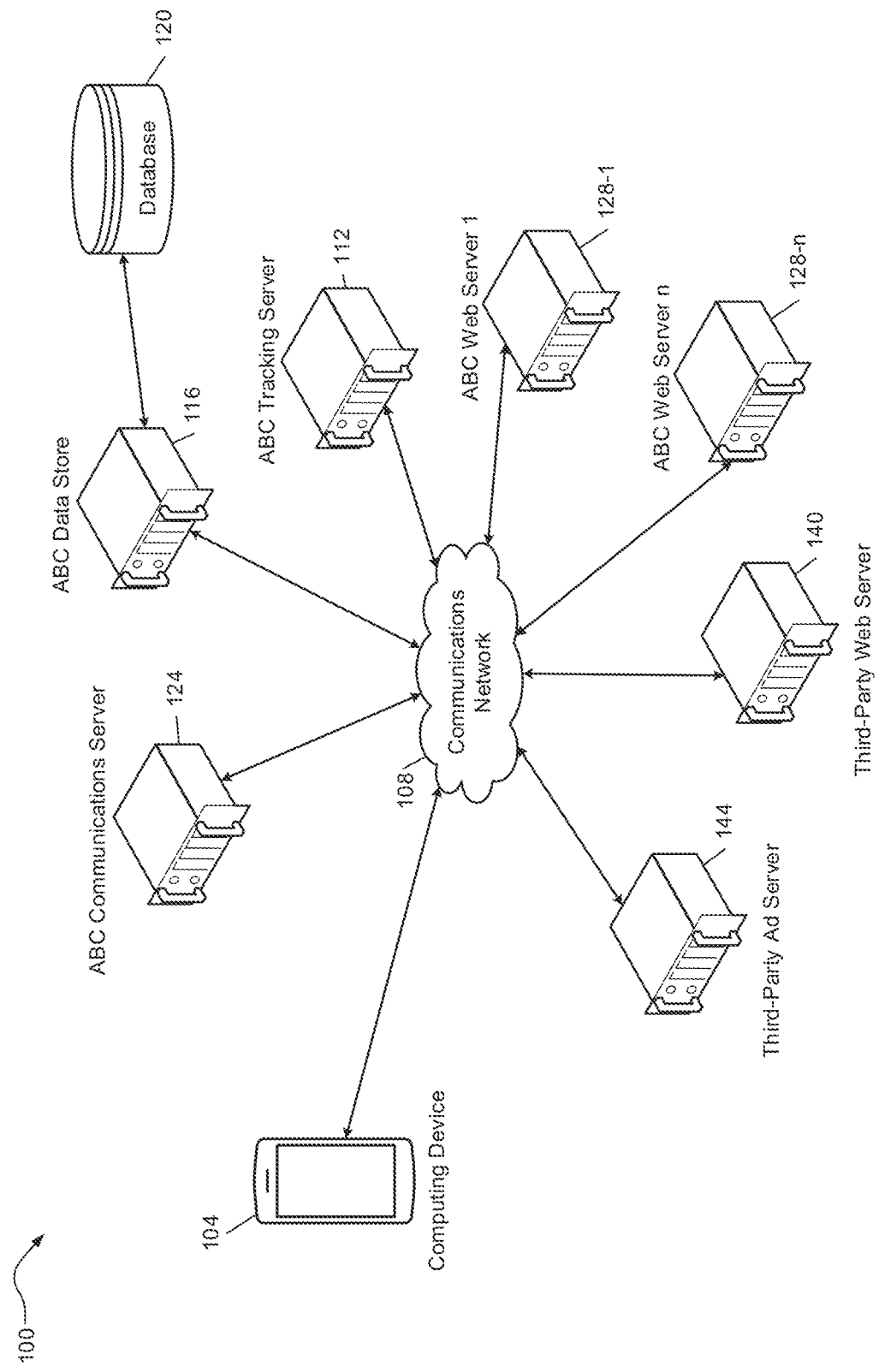
FIG. 1 is a functional block diagram of a simplified environment in which the principles of the present disclosure can be implemented.

The present disclosure describes systems and methods of employing cookies attached to pixels of digital content (such as web advertisements, emails, etc.) to implement database strategies to capture impressions and actions of users when users view and/or click on the digital content containing the pixel. For example, digital regulations are making it harder for companies to target and identify users, which is primarily done using cookies. Meanwhile, web browsers are increasingly limiting third-party cookies. As such, it may desirable to find a way to better identify people and market to them that's cookie-lite. For example, if a first-party pixel (e.g., created by a host domain) was embedded in digital content of a company when the content is served to users, impressions and exposure of the users may be captured so that the users can be appropriately targeted when they return to a website (e.g., domain) associated with the company.

For example, one of the pixels embedded in digital content of a company may reach out to the company's server when an external advertisement is shown, an email is opened, etc. Based on access requests to those pixels, logs may be generated for the advertisement, email, etc. being served to specific users. For example, an ID string may include information about the advertisement, video, what creative, where it ran, etc. This information may be used to understand media performance and to target specific users (for example, an existing client, a prospective client, etc.).

If an email with an embedded pixel is sent to a specific user (e.g., a specific client), code—or uniform resource locator (URL)—associated with the pixel may be specifically tailored to the user. This code is then provided to the company when the pixel is requested. If the pixel is embedded in digital content on the open web, the response including the pixel may carry first-party or third-party cookies with it to help identify that user's specific web browser. This allows a company to know which of its ads were seen by users, when the ads were seen, and in what order they were seen.

Since the pixel is served from the company's domain, if a user is browsing around the web and sees one of the company's ads and has been to one of the company's domains before, the web browser may treat the cookie as a friendly first-party cookie.

Some web browsers have rules that make it hard for third parties to track internet protocol (IP) addresses. For example, if a cookie is sent using JavaScript, the cookie may only last 5 days in some web browsers, rather than the industry standard of two years. By employing the teachings described herein, the life of the cookie may be extended via one or more server side requests. As such, the cookie may last as long as the server specifies, up to some global limit set by the browser.

Impressions may be stored inside the cookie itself rather than solely being stored in a separate database. As such, the information may be readily available (that is, instantly available to the server receiving the cookie). In some examples, a defined number (e.g., ten) of impressions may be stored in the cookie.

In addition to gauging user impressions and actions, the teachings help with fraud identification with respect to ads and impressions. By gathering information on users, a company can improve its ability to identify fraudulent activity. Further, by collecting some or all of the impressions data in-house, it allows the company's marketing team to analyze and understand effective message content, frequency and cadence, and ultimately better optimize millions of dollars in digital media spending.

The teachings also allow a company to run its own data collection as opposed to relying on third parties. This may be particular beneficial as third-party data begins to shrink. Significant cost savings may be possible when not relying on third parties. For example, this has the potential to reduce the scope of work of third-party ad agencies and niche digital analytic vendors.

With tightening restrictions on third-party cookies, companies will need to get creative to deliver tailored experiences to users while carefully balancing personalization with privacy. Embedding pixels in digital content, and then triggering communications and data exchange with a company's server, may help deliver such a tailored experience for a user. For example, automatic triggering of events based on interaction (e.g., loading, viewing, clicking on, etc.) with the digital content containing pixels having first-party cookies may help provide a tailored experience for a user.

The present disclosure describes a unique approach for implementing database strategies to capture impressions and actions of online users. The unique approach described here embeds pixels in digital communications (such as advertisements, emails, etc.) for rendering, such as in a web browser or in an email platform that renders HTML email content. The approach here then captures impressions when users view, click on, open, etc. the digital communications containing the pixels.

Web browsers are increasingly limiting third-party cookies—that is, cookies set by domains other than the one being specifically visited. As such, companies may be substantially limited in targeting and identifying users using third-party cookies. However, when one or more features of the unique approach described herein are implemented, cookies served in response to pixels embedded in the digital communications (e.g., digital content) may be considered first-party cookies when the digital communications are served via a specific domain. For example, if a user has previously visited a website associated with the specific domain, the cookies served with those pixels via the specific domain may have been treated (stored by the browser) as first-party cookies. First-party cookies may receive preferential treatment, such as by not deleting them when the browsing session ends. Further, the expiration date of third-party cookies may be shortened in comparison to the requested expiration prescribed by the server.

Cookies with the pixels may carry data associated with impressions. In such examples, the set cookies may be treated by the web browsers as friendly cookies, and not third-party cookies, because the user has previously visited a website associated with the specific domain. Once the user returns to a website associated with the specific domain, the stored impressions in the cookies may be captured. In various implementations, the pixel may be embedded in an advertisement displayed to the user by a kiosk during an operation such as a financial transaction. For example, the advertisement may be displayed before, after, or during a cash withdrawal from an automated teller machine (ATM). System In FIG. 1, a system 100 includes a computing device 104 communicating with a communications network 108. The communications network 108 includes a distributed communications system such as the Internet. The computing device 104 may be a personal computer running an operating system such as the Linux operating system from Linus Torvalds, the MacOS operating system from Apple Inc., or the Windows operating system from Microsoft Corp. The computing device 104 may be a portable device, such as a laptop, mobile phone, etc. The computing device 104 may be a wearable device such as a smartwatch. The computing device 104 may be a smart television, a set-top box, or a streaming device with video being output to a separate display. The computing device 104 may be a device that has no visual display, such as a smart speaker or other virtual assistant device.

The computing device 104 includes a hypertext markup language (HTML) renderer, which may take the form of a web browser. The HTML renderer may receive HTML data from the web (using HTTP, the Hypertext Transfer Protocol), via email, etc. In this application, a web browser context will be described for simplicity, but the teachings of the present disclosure apply to other user agents as well, including email user agents, etc.

When a user of the computing device 104 visits a webpage, such as by clicking a link, a uniform resource locator (URL) associated with the link causes the computing device 104 to reach out to the designated domain via the communications network 108. Simply for illustration, a fictional company ABC is shown in FIG. 1 to have implemented the principles of the present disclosure.

In this example implementation, ABC operates a tracking server 112, a data store 116 that may implement a database 120, a communications server 124, and web servers 128-1 through 128-n (collectively, web servers 128). The database 120 may be implemented using a structured query language (SQL) database, a relational database that does not conform to SQL standards, and/or a non-relational database. In various implementations, the data store 116 may use a different data structure, such as a column store.

Also shown in FIG. 1 is a third-party web server 140 and a third-party ad server 144. In this context, the term "third party" indicates that the web server 140 and the ad server 144 are not operated by ABC or by the user of the computing device 104. Further, the web server 140 and the ad server 144 are not necessarily operated by the same entity.

In various implementations, the computing device 104, the third party web server 140, and the third party ad server 144 do not have to be modified for ABC to take advantage of the principles of the present disclosure. In such instances, and as explained in more detail below, the third party ad server 144 may already be programmed to accept ad serving code (such as code in the JavaScript programming language) and ABC simply provides ad serving code that is consistent with the principles of the present disclosure.

In various implementations, ABC may operate an ad server in addition to or in place of the ad server 144. In various implementations, the communications server 124 may be omitted. In various implementations, some or all of the web servers 128 may be omitted. Further, the web servers 128 and/or the communications server 124 may be operated by ABC but may be separate from the tracking features of the present disclosure—that is, in various implementations the web servers 128 and the communications server 124 may be implemented according to the prior art without modification by the principles of the present disclosure.

While shown separately for purposes of illustration, the functions of the elements 112, 116, 124, and 128 may be combined into one or more other combinations of servers. As one example, the tracking server 112 may implement the data store 116. Further, the database 120 may not be a separate physical or logical entity but instead may simply be implemented within storage of the data store 116.

Although the simplified block diagram of FIG. 1 shows all devices connected directly to the communications network 108, one or more network devices may facilitate communication between the displayed devices, some of or all of which communication may bypass the communications network 108 entirely. For example, the web servers 128 may sit behind a common web firewall architecture. This architecture may be separate from or combined with firewalls behind which the tracking server 112 and the data store 116 are interconnected. As another example, the computing device 104 may connect through a home router before connecting to infrastructure of the communications network 108. Further, other entities, such as content delivery networks (CDNs), may replicate content from the web servers 128 for servicing requests by the computing device 104.

In brief, the data store 116 stores impression data. Impression data describes, for a given user, what content that user has interacted with. Typically, the interaction is visual, but interaction may take other forms, such as an audible output from a smart speaker. The impressions may be of advertisements, content, etc. presented to the user. This data may be stored for all users of services offered by ABC as well as for any other users who interact with ABC servers and/or receive advertisements purchased by or for ABC.

The impression data may include a number of parameters for each impression. Example parameters include a timestamp of when the impression occurred, an IP address that the user is using when the impression was made, content identification, impression outcome, identifying information of the user's browser, user identity, geographic location of the user at the time of the impression, impression origin, etc.

The identifying information of the user's browser may be based on the user-agent string supplied by the user's browser in an HTTP request. The geographical location may be determined by geolocation based on the IP address. The impression outcome may record whether the user interacted with the impressed content—for example, the user may be able to click on the content to perform an action, such as a purchase or request for more information. Whether this click occurred may be stored—either at the same time as the impression, or at a later time. The content identification may identify a campaign (such as an advertising campaign) that led to the content being displayed and may also identify the specific content provided (if multiple content variants are used for the same campaign). The impression origin may record whether the impression was made via the web, via email, etc. In the context of the web, the impression origin may identify the domain and exact webpage where the content was viewed.

The data store 116 may store impression data for users that are unknown to the data store 116. For example, if an impression is shown to a user not known to the data store 116, the data store 116 may store the impression as an unknown user impression. Over time, multiple impressions assumed to be for the same user (for example, impressions delivered to the same IP address) may be combined to form an understanding of that unknown user. If, at some point, the user authenticates to an ABC server, the user's identity can be determined and associated with the history of impressions.

The data store 116 is able to store impression data because that impression data is harvested by the tracking server 112 and, in some implementations, web servers 128. For example, when the user is visiting the third-party web server 140, code within a webpage served by the web server 140 may include a reference to the ad server 144. For example, an iframe may specify a page served by the ad server 144.

When the ad provided by the ad server 144 was purchased by ABC, the ad may include an image tag and/or other code, such as code in the JavaScript programming language, that instructs the computing device 104 to retrieve an image from the tracking server 112. This image is retrieved for tracking purposes and may be a very small image, such as an image that is one pixel wide by one pixel high (given its size, this image may be referred to as a tracking pixel). In various implementations, the code that fetches the tracking pixel may set a display attribute to none such that even that single pixel is not rendered for display on the computing device 104.

The purpose of the tracking pixel is so that information about the impression can be sent to the tracking server 112. For example, the URL from which the tracking pixel is requested may encode information for the tracking server 112. For example, the URL may be specific to the ad provided by the ad server 144 and may also indicate the exact webpage on the web server 140 where the ad appeared. The tracking server 112 can therefore decode the data within the URL and provide the data to the data store 116 for storage.

In addition, when the tracking pixel is requested by the computing device 104, the computing device 104 provides any cookies set by one of the ABC servers to the tracking server 112. One of these cookies may be an impression cookie, described in more detail below, that includes data indicating prior impressions of ABC content to the user of the computing device 104. The tracking server 112 can update the impression cookie based on the currently viewed ad and provide an updated value for the impression cookie back to the computing device 104 along with the tracking pixel. In various implementations, the tracking server 112 may obtain a set of updated impression data from the data store 116 for creation of the cookie. This ensures that the cookie is always up-to-date even if it has been removed from the computing device 104 by deletion or expiration.

The web servers 128 may also rely on the tracking server 112 to track impressions. In this way, the web servers 128 can simply incorporate tracking pixel requests to the tracking server 112, so that the tracking technology is focused on a single subsystem: tracking server 112. In various implementations, the web servers 128 can then be used with no configuration specific to the principles of the present disclosure beyond the integration of a tracking pixel.

In various implementations, the communications server 124 may send out marketing communications, such as by text message or email. A text message may include a custom link for each user that points to a page served by one of the web servers 128. The served page may include a tracking pixel served by the tracking server 112. When the communications server 124 transmits an email, the email may include an image placeholder (such as an HTML <img> tag) that points to a tracking pixel on the tracking server 112. As described in more detail below, the URL from which the tracking pixel is requested may encode information about the recipient of the communication as well as information about the communications campaign (such as a campaign ID). When the URL is received by the respective one of the web servers 128, the URL can be decoded to identify which campaign resulted in the impression and which recipient viewed (or heard, or otherwise experienced) the impression.

Flowcharts

Figure 2:
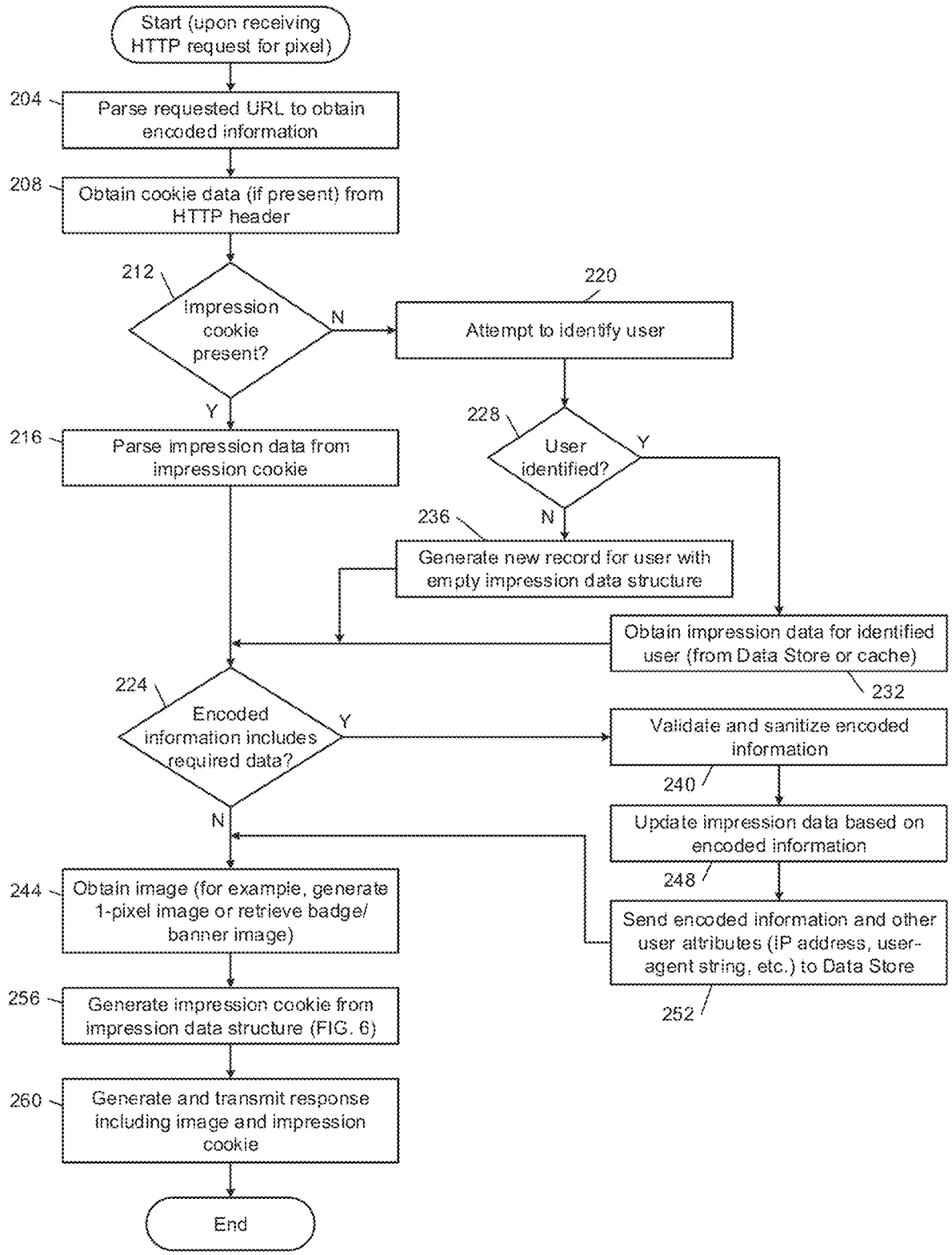
FIG. 2 is a flowchart of example operation of a tracking server according to the principles of the present disclosure.

FIG. 2 shows example operation of a tracking server (such as the tracking server 112) in response to a request for an image. In various implementations, the image may be a single pixel and may be referred to as a tracking pixel. Control begins upon receiving an HTTP request for the pixel at 204. At 204, control parses the URL to obtain encoded information. For example, as described above, the encoded information may indicate where the requested pixel originated, such as a particular advertisement campaign or source website. Control may also parse additional portions of the HTTP request, such as the user-agent string.

At 208, control obtains cookie data, if present, from the HTTP header. This cookie data will be provided if a cookie was previously set by the tracking server or by another server in the same domain. At 212, control determines whether an impression cookie is present in the cookie data. If so, control transfers to 216; otherwise, control transfers to 220. At 216, control parses impression data from the impression cookie and proceeds at 224.

At 220, control attempts to identify the user in the absence of the impression cookie. In various implementations, another cookie, such as a session identifier cookie set by the domain, may identify the user. In various implementations, the user may be identified by data such as IP address, user-agent string, existing cookies, header information, or a combination of multiple of these inputs. At 228, control determines whether the user was identified. If so, control transfers to 232; otherwise, control transfers to 236.

At 232, control obtains impression data for the identified user, such as from a data store. After 232, control continues at 224. In various implementations, control may maintain a cache of impression data, which can be queried for the identified user. If the cache does not contain the impression data, the impression data may be obtained from the data store; control may either proceed without the impression data while waiting for the data store and cache the obtained impression data for future use, or may wait for the data store before continuing at 224.

At 236, control generates a new record for the user with empty impression data. Control then continues at 224. At 224, control determines whether the encoded information (obtained at 204) includes required data. If so, control transfers to 240; otherwise, control transfers to 244. The required data may include a specific set of values. For example, the URL may need to include a specified set of name-value pairs in a query string portion of the URL. At 240, control validates and sanitizes the encoded information. For example, this may include removal of special characters, data type checking, and bounds checking. In various implementations, data that fails to satisfy validation criteria is discarded.

At 248, any sanitized information that passes the validation criteria is used to update the impression data structure. For example, the impression associated with the current tracking pixel request is added to the impression data structure. In various implementations, if the impression data structure was empty, this impression will be the only impression included in the impression data structure. At 252, control sends the encoded information and other user attributes to the data store. The user attributes may include IP address, user-agent string, geographic location of the user (which might be derived from IP address), etc. Control then continues at 244.

At 244, control obtains an image to provide in response to the HTTP request. For example, the image may be generated in code when the image is a simple one by one image—in some implementations, the single pixel may be stored in memory, such as in an environment variable. In other implementations, the provided image may be a badge or banner image. For example, in the context of the ABC company, a logo of the ABC company may be used as a badge. This logo may be used as the tracking image. Since this image may be larger, it may be retrieved rather than generated on-the-fly.

At 256, control generates an impression cookie based on the impression data. For example, the impression cookie may be generated as described in FIG. 6. At 260, control generates a response including an image and the values for the impression cookie. Control then transmits the response, including set-cookie instructions for the user agent to store the impression cookie in the requester's cookie store. Control then ends.

Figure 3:
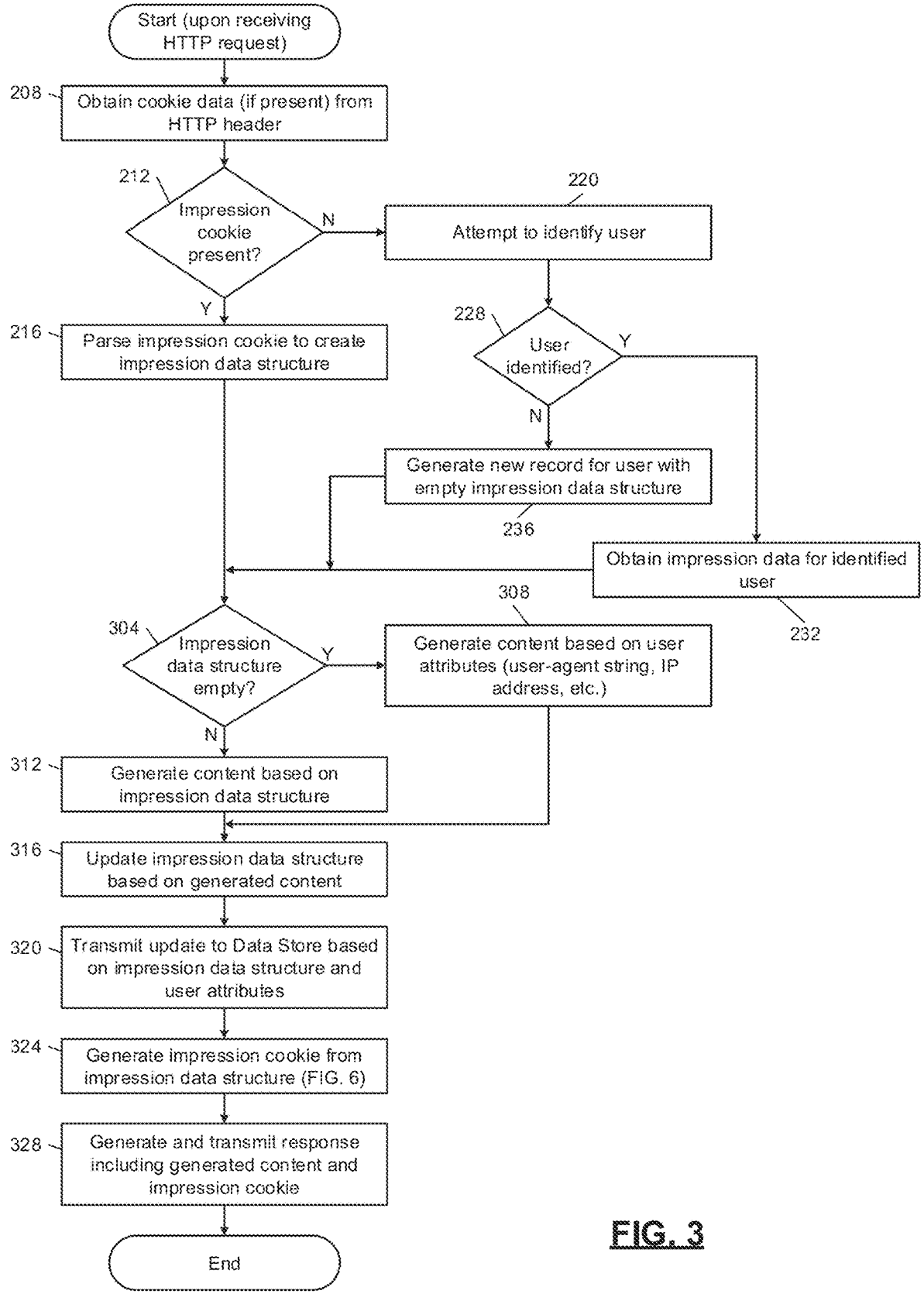
FIG. 3 is a flowchart showing server-side operation of cookie handling by a web server according to the principles of the present disclosure.

FIG. 3 shows example operation of a web server implementing its own tracking. In this case, the web server is operated by or for the same entity as the tracking server. As discussed above, the web server may outsource the tracking to the tracking server, in which case the web server would not need to incorporate any tracking technology other than simply embedding tracking pixels in the webpages served by the web server.

In implementations where the web server implements its own tracking, control proceeds in FIG. 3 similarly to the tracking server of FIG. 2. Similar control elements in FIG. 3 to those of FIG. 2 are labeled with the same reference numeral. While using the same reference numeral, these control elements are not necessarily identical and may vary depending on the implementation. Following any of 216, 232, and 236, control continues at 304.

At 304, control determines whether the impression data structure is empty—indicating that no previous impressions are known—if so, control transfers to 308; otherwise, control transfers to 312. At 308, control generates and/or collects content for the user. In various implementations, the content may be generated or selected based on user attributes that can be identified without knowledge of prior impressions. For example, the content may be based on user attributes derivable from such items as the user-agent string, IP address, etc. For example, certain advertisements may be targeted to certain geographies so that even if the user is unknown, their geolocation (which might be derived from IP address) may indicate which advertisement should be served to the user. Control then continues at 316.

At 312, control generates and/or collects content based on the impression data structure. For example, if the user has had impressions for one particular service of the company—as evidenced by impressions for that service being served based on relevant searches or web browsing—content, such as advertisements, may be generated for the user based on those impressions. For example only, advertisements may be selected based on the inferred interests of the user. These inferences may be drawn from past impressions.

Additionally or alternatively, content other than advertisements may be selected for the user based in the impression data structure. For example, educational content relevant to the user may be placed more prominently. The relevance may be inferred based on the impression data structure. In a more specific example, the webpage served by the web server may have a list of educational articles and this list may be sorted based on the inferred relevance of the articles to the user based on the impression data structure. Control then continues at 316.

At 316, the impression data structure is updated based on the generated content. For example, if the generated content includes a particular advertisement, the impression data structure may be updated to reflect that the advertisement will be provided to the user. At 320, control transmits an update to the data store based on the impression data structure and user attributes. The user attributes may be the same as or different than the user attributes referred to at 308. In various implementations, only the added impression to the impression data structure is transmitted. In other implementations, the entire impression data structure may be transmitted.

Figure 6:
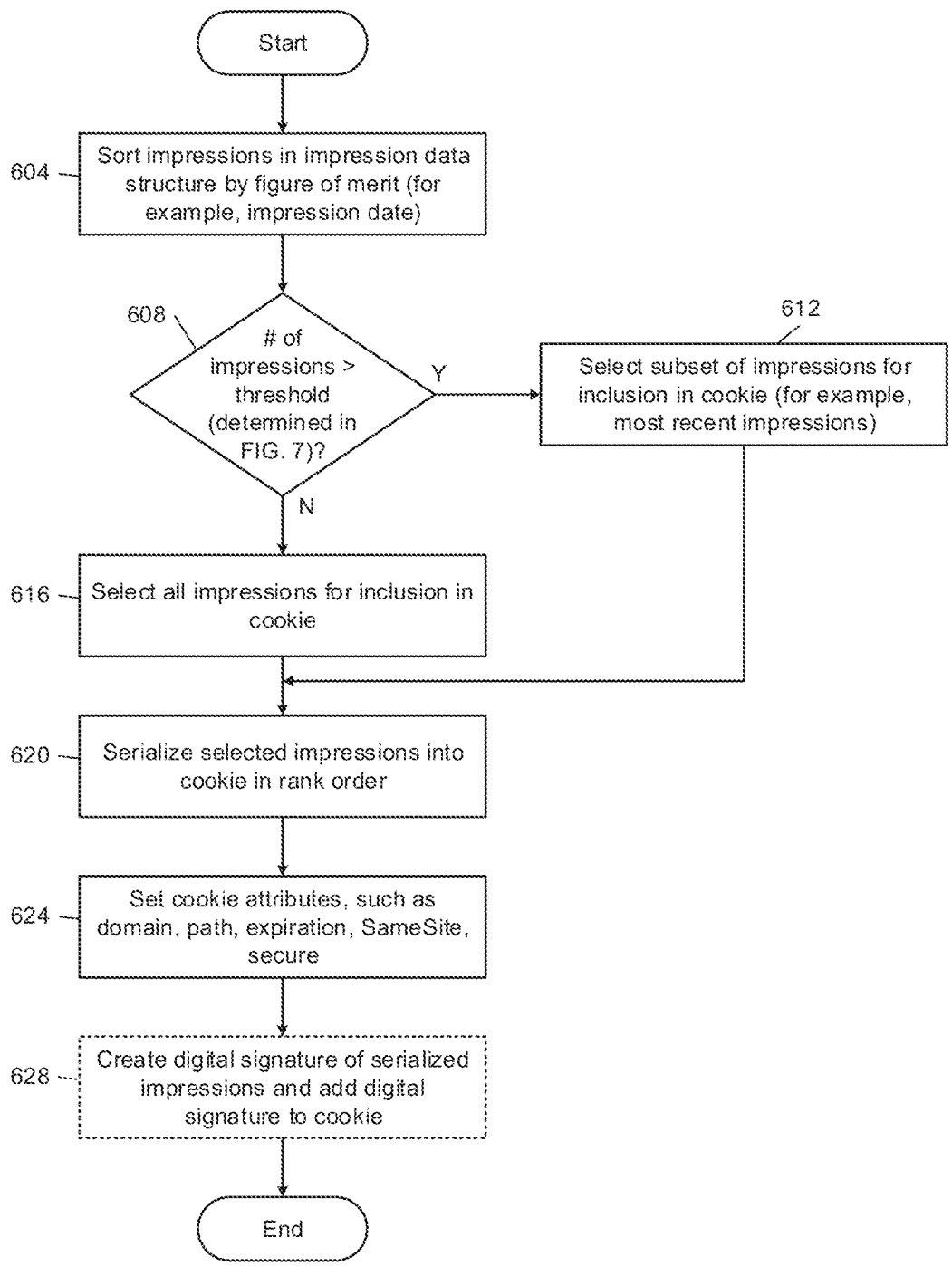
FIG. 6 is a flowchart of example cookie creation according to the principles of the present disclosure.

Control continues at 324, where control creates an impression cookie from the impression data structure. For example, the cookie may be generated as shown in FIG. 6. At 328, control generates a response including the generated content and the impression cookie. Control transmits the response to the HTTP requestor. Control for this HTTP request then ends.

Figure 4:
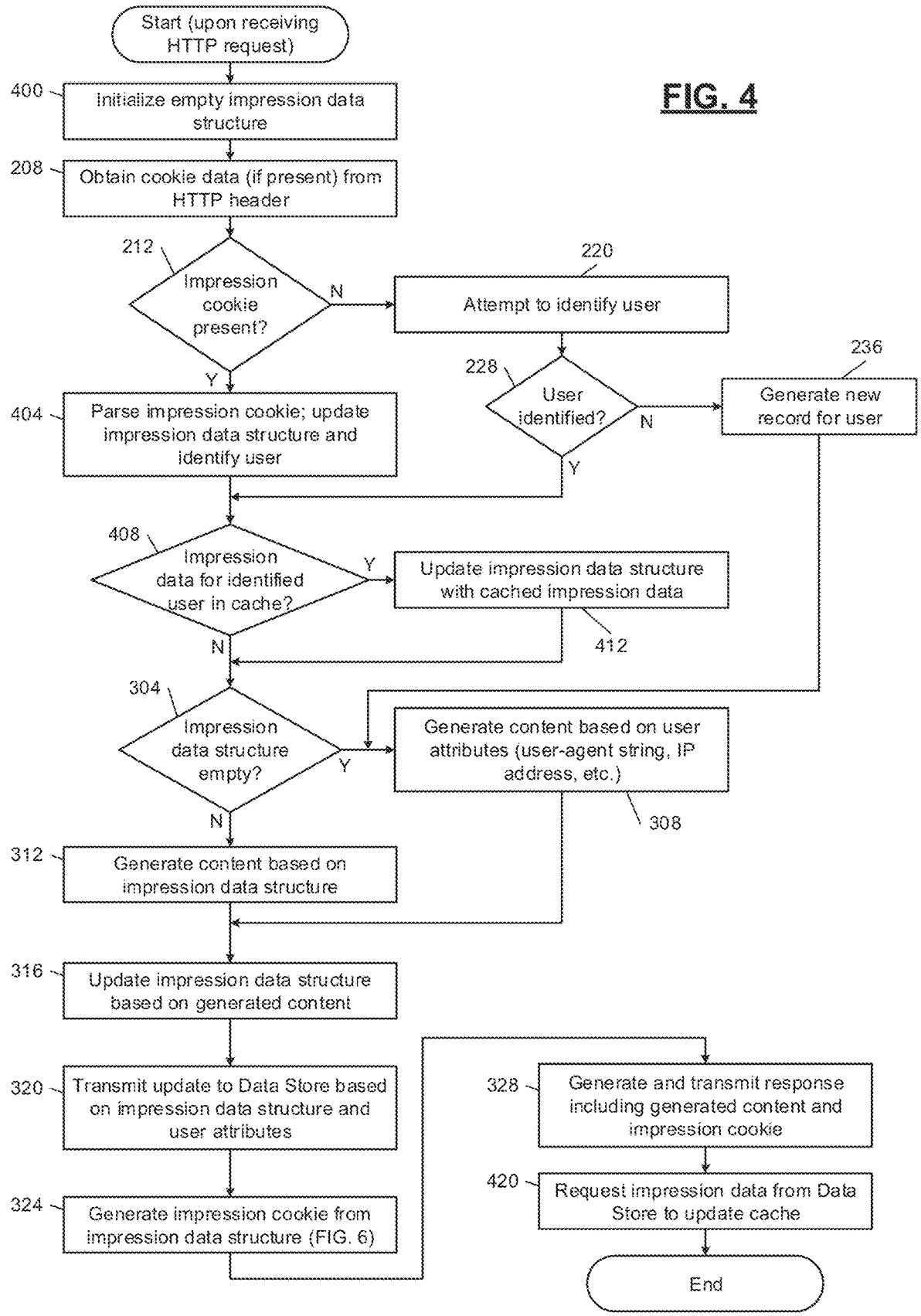
FIG. 4 is a flowchart of web server operation with impression data caching.

In FIG. 4, example operation of a web server implementing impression caching is presented. For control elements that are similar to those of FIG. 3, the same reference numeral is used for conciseness. FIG. 4 begins upon receiving an HTTP request, where at 400 an empty impression data structure is initialized. Control then continues to 208, which may be similar to control element 208 of FIG. 2. Control continues at 212, where if an impression cookie is present, control transfers to 404; otherwise, control transfers to 220.

At 404, control parses the impression cookie and updates the impression data structure. In addition, control identifies the user based on the impression cookie, which may include a unique identifier of the user. Control then continues at 408. If, at 408, impression data for the identified user is present in a cache data structure, control transfers to 412; otherwise, control transfers to 304.

The cache data structure (referred to as a "cache" for simplicity) may contain a subset of the data stored by the data store. At certain times, some of the data in the cache may be obsolete with respect to the data stored by the data store and some of the data in the cache may be more recent than the data stored by the data store. As described in more detail below, the cache may store impression data for users who have recently visited the web server.

The purpose of the cache is to remove obtaining impression data from the data store from the critical path of responding to a request for a webpage. By caching impression data, the new impression cookie can be created without slowing down the HTTP response and the most up-to-date impression data can then be retrieved from the server following the response.

Caches are usually designed such that there will often not be enough storage space to store the entire collection of data from the primary repository (in this case, the data store). As a result, one or more eviction policies may be used. In various implementations, the eviction policies may be triggered by the cache satisfying a set of criteria. When the set of criteria includes more than one criterion, satisfaction may be defined by satisfying one, multiple, or all of the set of criteria. A first criterion may be a size threshold measured in, for example, megabytes or gigabytes. A second criterion may be a count threshold measured in number of impression entries stored in the cache or measured in number of users having one or more entries stored in the cache.

In response to satisfying the set of criteria, cache items that have been used least frequently and/or least recently may be deleted to make room for new data in the cache. In addition to being limited to recent users, the cache may also be limited to recent impressions of those users. As an example, if impression cookies are limited to the 10 most impression impressions, the cache may retain just the most recent 9 impressions. Then, when a new impression is made, that impression can be added to the 9 cached impressions to create a new impression cookie. Impressions beyond these 9 may therefore be purged from the cache to make more room in the cache.

At 412, impression data for the user is found in the cache, so control updates the impression data structure with the cached impression data. Control then continues at 304. After 328, control continues at 420. At 420, control requests impression data from the data store in order to refresh the cache for that user. Control then ends.

In various implementations that differ from those illustrated in FIG. 4, control may wait for impression data from the data store if impression data is not present in the cache. In this way, HTTP responses can be quickly provided to users whose impression data is in the cache while users whose impression data is not in the cache may experience a longer response time. While caching is shown in the context of the web server, caching may also be implemented by the tracking server. Accordingly, in various implementations FIG. 2 may be updated to perform a cache lookup in place of obtaining impression data at 232.

Figure 5:
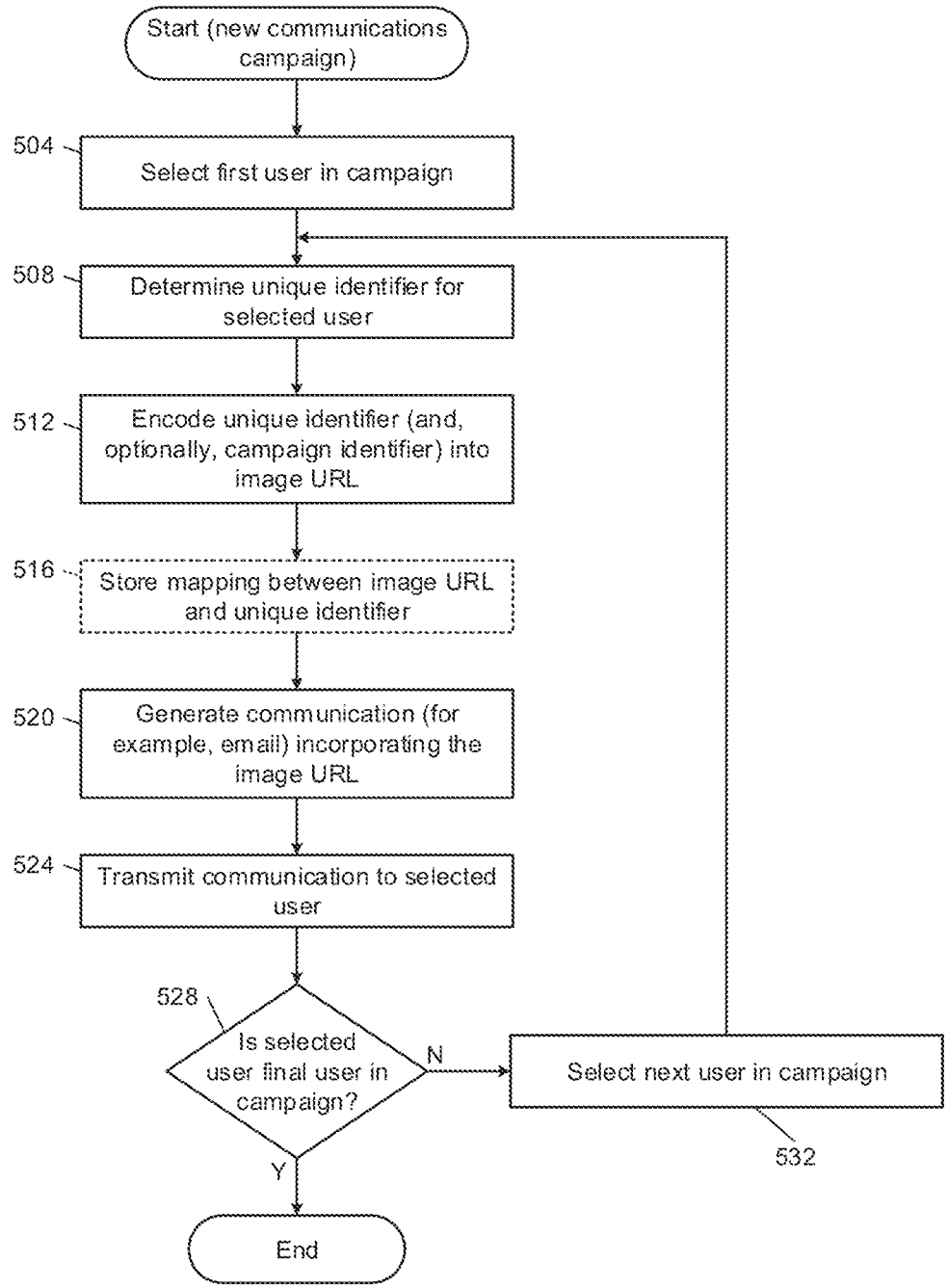
FIG. 5 is a flowchart of example operation of a communications server according to the principles of the present disclosure.

In FIG. 5, a communications server commences a new communications campaign. For example, this may be an email campaign to registered users of one or more of the company's products. In this simplified flow diagram, control begins at 504, where control selects the first user in the campaign. To continue the email example, this first user would be the first email recipient to whom an email will be sent.

At 508, control determines a unique identifier for the selected user. The unique identifier may be created for one-time use and associated with the selected user in a user database. In this way, the internal unique identifier for the selected user is not exposed to the outside world via the communications campaign. In other implementations, the unique identifier is simply an internal unique identifier for the user. For example, this may be a key field for the user in a relational database.

At 512, control encodes the unique identifier into an image URL. For example, the unique identifier—and, optionally, an identifier of the communications campaign—] may be added to a query string of the URL. In other cases, this information may be encoded as part of a path or filename for the image in the URL. At 516, control may optionally store a mapping between the image URL and the unique identifier. For example, this may be performed when the image URL only encodes a unique value that does not itself carry the information indicating the user's unique identifier and campaign identifier.

At 520, control generates a communication incorporating the image URL. The image URL points to an image on the tracking server, such as a single-pixel tracking image. At 524, control transmits the communication to the selected user. At 528, control determines whether the selected user is the final user in the campaign. If so, control ends; otherwise, control transfers to 532. At 532, control selects the next user in the campaign and returns to 508.

FIG. 6 shows example creation of an impression cookie according to the principles of the present disclosure. Not shown is creation of other cookies, such as session or user identification cookies, which may be used across the domain for purposes of authentication and user identification. At 604, control processes an impression data structure, such as that described in FIGS. 2-4. The impression data structure includes a set of impressions. Each impression has associated metadata, such as impression date, that can be used to sort the impression data structure. In various implementations, the impression data structure may already be sorted, in which case 604 may be omitted. For example, the impression data structure may be a sorted linked list in which every new entry is added to the linked list in the desired sorted location.

At 608, control determines whether the impression data structure satisfies a set of criteria. For example, a criterion may be that the impression data structure includes a number of impressions that exceeds a threshold. The threshold may be a predefined number, such as 10, that is set at the commissioning of the system. The number may be manually adjusted by the operator. In other implementations, the threshold may be adjusted dynamically as described in FIG. 7. If the set of criteria is satisfied, control transfers to 612; otherwise, control transfers to 616.

At 616, all impressions are selected for inclusion in the cookie. Control then continues at 620. At 612, control selects a subset of the available impressions for inclusion in the cookie. For example, control may select the most recent number of impressions, where the number of impressions is equal to the threshold. Control then continues at 620.

At 620, control serializes the selected impressions into a cookie data structure in rank order. This order may have been established by the sorting of 604. At 624, control sets one or more cookie attributes including an expires date and/or a max-age number, a domain string, a path string, a Secure attribute, an HttpOnly attribute, a SameSite attribute, etc.

At 628, an optional step includes creating a digital signature of the serialized impressions. The digital signature is then added to the cookie data structure to prevent tampering with the cookie by the user. The digital signature may prevent such tampering or may at least prevent such tampering from going undetected.

The cookie (or more precisely, the name-value pairs to include in a set-cookie instruction) is then complete and control ends.

Threshold Adjustment

Figure 7:
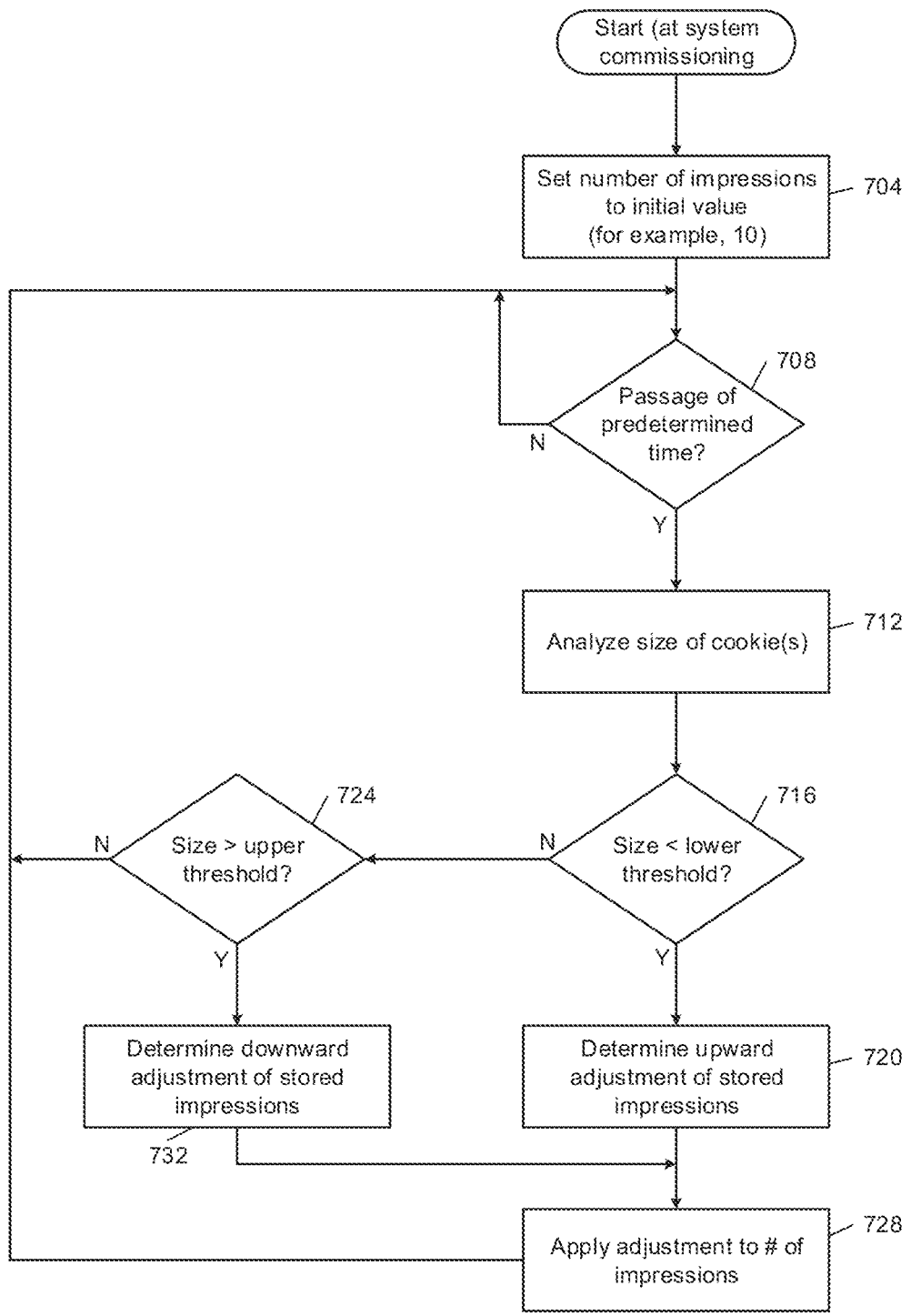
FIG. 7 is a flowchart of example dynamic impression limit management according to the principles of the present disclosure.

In FIG. 7, an example process for setting the number of impressions to be stored into the first-person cookie is described. The process may begin for all users when the first-party cookie system is first commissioned. In various other implementations, the process may be separately conducted for each user, and may therefore start when a new user is identified.

According to current browser implementations, the total size of cookies for a domain is capped at certain limits, which may vary by browser. As one numeric example, all modern, widely-available browsers support a total cookie size of approximately 4096 bytes (4 KB). To prevent the first-party cookie from using up the entire cookie space for the operator's domain and preventing other cookies from being set, the amount of space occupied by the first-party cookie is constrained. This may be achieved by limiting the maximum number of impressions stored into the first-party cookie. As an example, the size of impression data may be limited to 500 bytes, which may correspond to approximately 10 impressions.

The present disclosure describes analyzing the size of the cookie space and adjusting the maximum number of impressions stored over time. In various implementations, an artificial intelligence (AI) or machine learning (ML) system is used to learn and adjust the number of limitations, which may be performed on a per-user basis. The following description is a simplistic illustration of closed-loop control of the maximum number of impressions.

At 704, control sets the number of impressions (that is, the maximum number of impressions allowed to be stored into a first-party cookie) to an initial value, such as 10. At 708, control determines whether a set of criteria are satisfied. For example, the set of criteria may include a criterion based on an amount of time having passed since a most-recent prior analysis. For example only, a predetermined time may be configured, such as 7 days, 30 days, etc.

If the set of criteria are satisfied, control transitions to 712; otherwise, control remains at 708. At 712, control determines a size of the user's cookie, such as in bytes. In various implementations, the size determined is based on the cookies of multiple or even all users. For example, a mean or median of the sizes may be determined. In various implementations, the size may be calculated as the mean plus one standard deviation.

At 716, control determines whether the size is less than a lower threshold. If so, control transfers to 720; otherwise, control transfers to 724. The lower threshold may be a defined number such as 512 (bytes). At 720, control determines an upward adjustment for the number of stored impressions. For example, control may subtract the size from the lower threshold to obtain a delta and then divide the delta by an average size of an impression. The average size of an impression may be determined empirically or may be configured by a developer. Control then continues at 728.

At 724, control determines whether the size is greater than an upper threshold. As an example only, the upper threshold may be 544 (bytes). If the size is greater than the upper threshold, control transfers to 732. Otherwise, control returns to 708 to wait once again for passage of the predetermined time.

At 732, control determines a downward adjustment of the number of stored impressions. For example, control may subtract the upper threshold from the size to obtain a delta and then divide the delta by an average size of an impression. The average size of an impression may be determined empirically or may be configured by a developer. Control then continues at 728.

At 728, control applies the determined adjustment to the number of impressions. Control then returns to 708 to wait once again for passage of the predetermined time.

Message Sequence Chart

Figure 8:
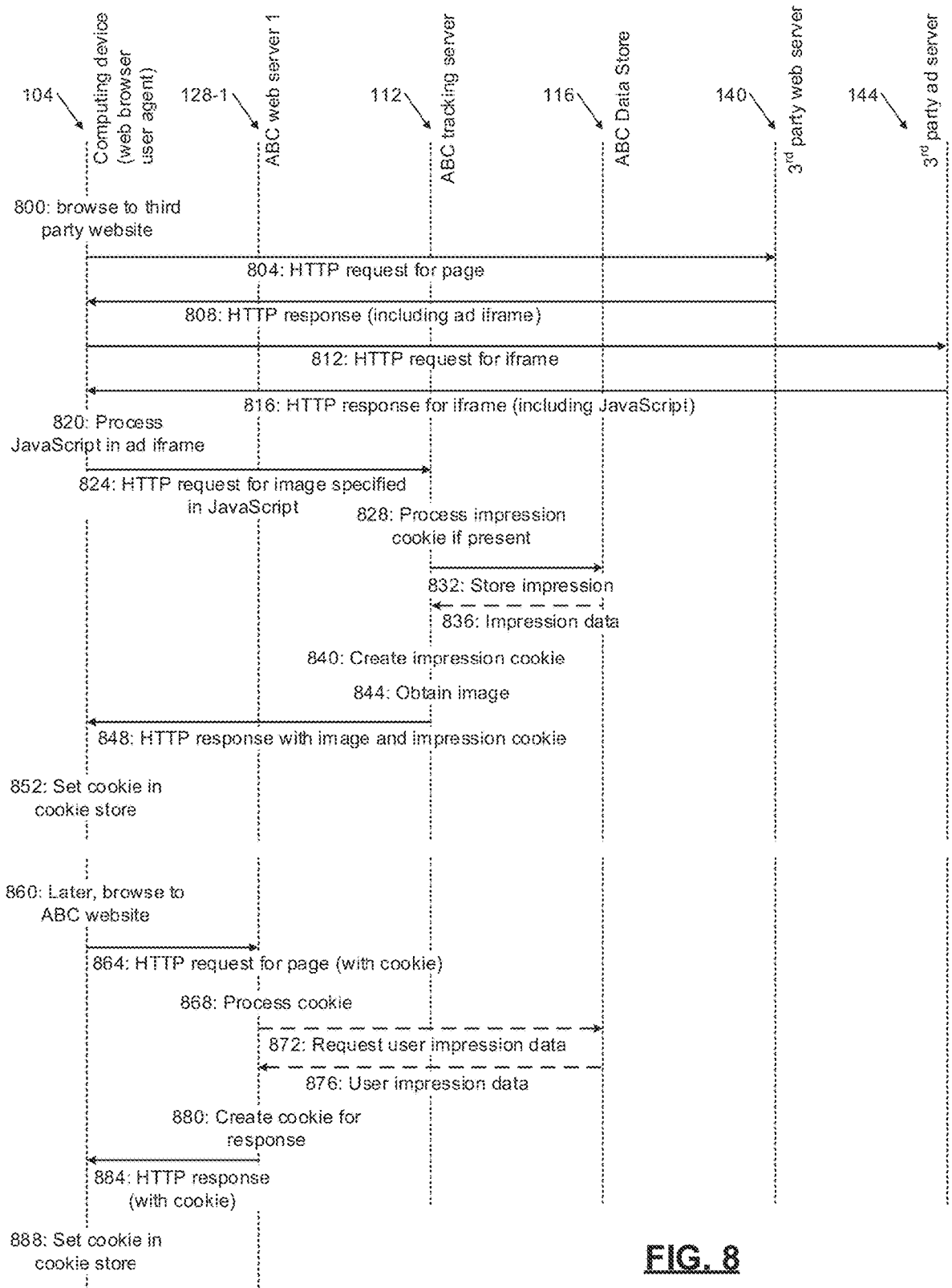
FIG. 8 is a message sequence chart of a simplified set of interactions between a browser client and a set of servers according to the principles of the present disclosure.

FIG. 8 is a message sequence chart depicting a simplified set of interactions between the computing device 104 and web servers, including the web server 128-1 and the web server 140. At 800, the user uses the computing device 104 to browse to a third-party website. For example, this may include clicking a link from an email or another website. To retrieve that website, the computing device 104 transmits an HTTP request (at 804) for the specified page to the web server 140. While reference is made to the computing device 104, the user agent of the web browser may be the actual software entity making the request within the computing device 104. As described above, other forms of user agent, such as an HTML rendering engine for email, may additionally or alternatively be operating in the computing device 104.

At 808, the web server 140 responds to the request with an HTTP response. The response carries a webpage including an advertisement, which may take the form of an iframe—an iframe is a way of placing another HTML document within the main HTML document. At 812, an HTTP request is made for the iframe. In this case, the advertisement is served by the ad server 144 and therefore the iframe designates that the request should be sent to the ad server 144.

At 816, the ad server 144 responds with an HTTP response, which includes code for retrieving a tracking pixel. For example, the code may include an <a> tag with an href attribute pointing to the image. In other implementations, the code may include code in the JavaScript programming language that generates a request for the tracking image. At 820, the computing device 104 processes the code in the ad iframe, which may involve executing JavaScript programming language code.

At 824, an image is specified (such as by JavaScript programming language code) and therefore an HTTP request is sent to the tracking server 112 to retrieve the image. If the user of the computing device 104 has visited the web server 128-1 in the past, one or more cookies for the ABC domain may have been set in the browser of the computing device 104. These cookies are then provided in the HTTP request.

At 828, the tracking server 112 processes any impression cookie that may have been provided at 824. At 832, the tracking server 112 sends data about the current ad impression to the data store 116. In various implementations, the data store 116 may provide updated impression data to the tracking server 112. In other implementations, impression data may solely be retrieved from the impression cookie, trusting that the impression cookie has the most recent impression data. Additional information about example operation of the tracking server 112 can be found in FIG. 2.

At 840, control creates a new value for the impression cookie. At 844, the tracking server 112 obtains the requested image. At 848, tracking server 112 transmits an HTTP response including the image to the computing device 104. The response instructs the user agent to store the impression cookie into the cookie store using the set-cookie HTTP response header. At 852, subject to the cookie settings of the computing device 104, the user agent sets the cookie into the cookie store. Although not shown here, additional cookies, such as authentication and other identification cookies may also be stored for the ABC domain.

At some later point, as visually indicated by a gap in the broken lines, the user browses to an ABC website at 860. This causes the computing device 104 to transmit an HTTP request for the specified webpage at 864. This request is transmitted to, in this example, the web server 128-1. While not shown explicitly, web servers frequently interact with load balancers and therefore the request may go be directed to any number of different physical servers according to the direction of the load balancer.

The HTTP request includes any cookies for ABC domain, including the impression cookie that was created at 840. In various implementations, the web server 128-1 may request user impression data (at 872) from the data store 116. Along with this request, the web server 128-1 may provide data to the data store 116 about the impression that will result from the web server 128-1 responding to the HTTP request. At 876, the data store 116 responds to the web server 128-1 with user impression data.

As described above, 872 and 876 may be skipped or omitted altogether if a design assumption is made that the impression cookie processed in 868 already has the latest impression data. Also as described above, the web server 128-1 may be caching impression data so that 872 and 876 are not part of the critical path for responding to the HTTP request. At 880, the web server 128-1 creates a cookie for the response based on the existing impressions and, in various implementations, the impression being created at the present time.

At 884, the web server 128-1 returns an HTTP response to the computing device 104. This response includes a set-cookie header to communicate a cookie to the user agent. At 888, the user agent sets the cookie in the cookie store. Because the cookie is being provided by the web server 128-1 from which the webpages being fetched, the cookie will be treated as a first-party cookie. As a result, depending on the browser and the browser configuration, the cookie may be allowed to have a later expiration date and may be protected from purging, such as at the end of the browsing session. While the simplified illustration in FIG. 8 ends here, the interaction between the computing device 104 may be repeated with the web servers 128, the web server 140, and any number of other web servers.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer server comprising:
a memory storing computer readable instructions; and
processing circuitry configured to execute the computer readable instructions to cause the computer server to,
parse a received hypertext transfer protocol (HTTP) request from a user agent to identify whether an impression cookie is present,
generate a new impression based on the HTTP request,
in response to the impression cookie being absent and a user of the user agent not being identifiable,
generate a new record for the user in an impression data structure,
generate content based on attributes associated with the user,
update the impression data structure based on the generated content,
determine a set of serialized impressions based on the generated content, and
generate a new impression cookie based on serializing the new impression and the set of serialized impressions, and
transmit a HTTP response to the user agent, wherein the HTTP response includes the new impression cookie.

2. The computer server of claim 1, wherein:
each impression in the new impression cookie is associated with a timestamp; and
wherein the processing circuitry is further configured to execute the computer readable instructions to cause the computer server to determine an order of the impressions within the new impression cookie by sorting on the timestamps.

3. The computer server of claim 1, wherein the processing circuitry is further configured to execute the computer readable instructions to cause the computer server to generate the new impression based on information encoded in a uniform resource locator (URL) specified by the HTTP request.

4. The computer server of claim 1, wherein the processing circuitry is further configured to execute the computer readable instructions to cause the computer server to transmit the new impression and metadata to a database server, the metadata including information based on a user-agent string from the HTTP request.

5. The computer server of claim 1, wherein the HTTP response includes an image.

6. The computer server of claim 5, wherein the image is one pixel in height and one pixel in width.

7. The computer server of claim 1, wherein the processing circuitry is further configured to execute the computer readable instructions to cause the computer server to generate the content based on at least one of a user-agent string of the HTTP request and an internet protocol (IP) of the user agent.

8. A computer-implemented method comprising:
parsing a received hypertext transfer protocol (HTTP) request from a user agent to identify whether an impression cookie is present,
generating a new impression based on the HTTP request,
in response to the impression cookie being absent and a user of the user agent not being identifiable,
generating a new record for the user in an impression data structure,
generating content based on attributes associated with the user,
updating the impression data structure based on the generated content,
determining a set of serialized impressions based on the generated content, and
generating a new impression cookie based on serializing the new impression and the set of serialized impressions, and
transmitting a HTTP response to the user agent, wherein the HTTP response includes the new impression cookie.

9. The computer-implemented method of claim 8, wherein:
each impression in the new impression cookie is associated with a timestamp; and
the method further comprises determining an order of the impressions within the new impression cookie by sorting on the timestamps.

10. The computer-implemented method of claim 9, wherein generating the new impression includes generating the new impression based on information encoded in a uniform resource locator (URL) specified by the HTTP request.

11. The computer-implemented method of claim 10, further comprising transmitting the new impression and metadata to a database server, the metadata including information based on a user-agent string from the HTTP request.

12. The computer-implemented method of claim 8, wherein generating content based on attributes associated with the user includes generating content based on at least one of a user-agent string of the HTTP request and an internet protocol (IP) of the user agent.

13. The computer-implemented method of claim 12, wherein the HTTP response includes an image.

14. The computer-implemented method of claim 13, wherein the image is one pixel in height and one pixel in width.

15. A non-transitory computer readable medium storing computer readable instructions, which when executed by processing circuitry of a computer server, causes the computer server to:

parse a received hypertext transfer protocol (HTTP) request from a user agent to identify whether an impression cookie is present, generate a new impression based on the HTTP request, in response to the impression cookie being absent and a user of the user agent not being identifiable, generate a new record for the user in an impression data structure, generate content based on attributes associated with the user, update the impression data structure based on the generated content, determine a set of serialized impressions based on the generated content, and generate a new impression cookie based on serializing the new impression and the set of serialized impressions, and transmit a HTTP response to the user agent, wherein the HTTP response includes the new impression cookie.

16. The non-transitory computer readable medium of claim 15, wherein:

each impression in the new impression cookie is associated with a timestamp; and the computer server is further caused to determine an order of the impressions within the new impression cookie by sorting on the timestamps.

17. The non-transitory computer readable medium of claim 15, wherein the computer server is further caused to generate the new impression based on information encoded in a uniform resource locator (URL) specified by the HTTP request.

18. The non-transitory computer readable medium of claim 15, wherein the computer server is further caused to transmit the new impression and metadata to a database server, the metadata including information based on a user-agent string from the HTTP request.

19. The non-transitory computer readable medium of claim 15, wherein the HTTP response includes an image that is one pixel in height and one pixel in width.

20. The non-transitory computer readable medium of claim 15, wherein the computer server is further caused to generate the content based on at least one of a user-agent string of the HTTP request and an internet protocol (IP) of the user agent.

* * * * *

UNITED STATES PATENT AND TRADEMARK OFFICE
CERTIFICATE OF CORRECTION

| | |
|---|---|
| PATENT NO. | : 12,071,296 B2 |
| APPLICATION NO. | : 18/353253 |
| DATED | : August 27, 2024 |
| INVENTOR(S) | : Kevin Michael Wysocki et al. |

It is certified that error appears in the above-identified patent and that said Letters Patent is hereby corrected as shown below:

On the Title Page

Item (54) and in the Specification Column 1, Lines 1-3, "FACILITATING INTER-SYSTEM DATA TRANSFER WITH SERALIZED DATA OBJECTS" should be --FACILITATING INTERSYSTEM DATA TRANSFER WITH SERIALIZED DATA OBJECTS--

Item (63) Related U.S. Application Data, Line 3, "17/264,995" should be --17/164,995--

Signed and Sealed this
Fifteenth Day of October, 2024

Katherine Kelly Vidal
*Director of the United States Patent and Trademark Office*